United States Patent
Künzler

(10) Patent No.: US 11,905,351 B2
(45) Date of Patent: Feb. 20, 2024

(54) SILICONE HYDROGEL MATERIALS

(71) Applicant: Envision Biomedical LLC, York, PA (US)

(72) Inventor: Jay Friedrich Künzler, Webster, NY (US)

(73) Assignee: Envision Biomedical LLC, York, PA (US)

(*) Notice: Subject to any disclaimer, the term of this patent is extended or adjusted under 35 U.S.C. 154(b) by 160 days.

(21) Appl. No.: 17/226,226

(22) Filed: Apr. 9, 2021

(65) Prior Publication Data

US 2021/0317244 A1 Oct. 14, 2021

Related U.S. Application Data

(60) Provisional application No. 63/007,991, filed on Apr. 10, 2020.

(51) Int. Cl.
| | | |
|---|---|---|
| *C08F 220/06* | (2006.01) | |
| *G02B 1/04* | (2006.01) | |
| *G02C 7/04* | (2006.01) | |
| *C08L 101/14* | (2006.01) | |
| *C08J 3/075* | (2006.01) | |

(52) U.S. Cl.
CPC ............ *C08F 220/06* (2013.01); *C08J 3/075* (2013.01); *C08L 101/14* (2013.01); *G02B 1/043* (2013.01); *G02C 7/04* (2013.01)

(58) Field of Classification Search
CPC .................................................... G02B 1/043
See application file for complete search history.

(56) References Cited

U.S. PATENT DOCUMENTS

| | | |
|---|---|---|
| 3,808,179 A | 4/1974 | Gaylord |
| 4,139,513 A | 2/1979 | Tanaka et al. |
| 4,259,467 A | 3/1981 | Keogh et al. |
| 4,260,725 A | 4/1981 | Keogh et al. |
| 4,277,595 A | 7/1981 | Deichert et al. |
| 4,711,943 A | 12/1987 | Harvey, III |
| 4,910,277 A | 3/1990 | Bambury et al. |
| 5,321,108 A | 6/1994 | Kunzler et al. |
| 5,965,631 A | 10/1999 | Nicolson et al. |
| 6,166,236 A | 12/2000 | Bambury et al. |
| 6,822,016 B2 | 11/2004 | McCabe et al. |
| 7,052,131 B2 | 5/2006 | McCabe et al. |
| 8,937,110 B2 | 1/2015 | Alli et al. |
| 8,980,972 B2* | 3/2015 | Driver ............... C08F 30/02 526/279 |
| 9,039,174 B2 | 5/2015 | Awasthi et al. |
| 2007/0142583 A1* | 6/2007 | Schorzman ........ C08F 230/08 526/279 |

* cited by examiner

*Primary Examiner* — Michael F Pepitone
(74) *Attorney, Agent, or Firm* — Collard & Roe, P.C.

(57) ABSTRACT

A composition includes at least one siloxy-based (meth) acrylate monomer or prepolymer, at least one additional methacrylate monomer, UV, and Visible light blocking agents and one or more crosslinking agents. The final product results in a highly wettable material that possesses physical properties such as a low modulus of elasticity and high oxygen permeability without the need for a non-reactive solubilizing agent and that are free of cyclic and linear siloxanes.

13 Claims, No Drawings

SILICONE HYDROGEL MATERIALS

CROSS REFERENCE TO RELATED APPLICATIONS

Applicant claims priority under 35 U.S.C. § 119(e) of U.S. Provisional Application Ser. No. 63/007,991 filed Apr. 10, 2020, the disclosure of which is incorporated by reference.

FIELD OF INVENTION

This invention is directed to hydrogel materials that are useful in the manufacture of biocompatible medical devices, for example, hydrogel materials having desirable physical properties for use as a contact lens. More specifically, this invention is directed towards polymerizable siloxy-based monomers once fabricated result in hydrogels possessing properties ideal for contact lens application, especially oxygen permeability, low elasticity of modulus and wetting and lubricity without the need for solubilizing agents that when fabricated result in a new class of hydrogels that are free of cyclic and linear siloxanes.

BACKGROUND OF THE INVENTION

Hydrogels are hydrophilic polymers that absorb water, and are essentially insoluble in water at physiologic temperature, pH, and ionic strength due to the presence of a three-dimensional polymeric network. The three-dimensional network includes crosslinks between polymer chains of the network, and these crosslinks can be formed by covalent bonds, electrostatic, hydrophobic, or dipole-dipole interactions. The hydrophilicity of the hydrogel materials is in large part due to the presence of hydrophilic groups, including, but not limited to, hydroxyl, carboxyl, acid, amide, sulfonic or phosphonic groups, in some instances, along the polymer backbone, and in other instances, as functional side groups that extend from the polymer backbone. Generally, a hydrogel is a crosslinked polymer that absorbs water to an equilibrium value of at least 10% water. The water-swollen equilibrated state of a hydrogel results from a balance between an osmotic force that drives the water to enter the hydrophilic polymer network, and a cohesive force exerted by the polymer chains in resisting expansion. In some fashion, both the osmotic force and the cohesive force correlates with the type of monomers used to prepare the hydrogel polymeric material and the crosslink density of the polymeric hydrogel material. In general, a person of ordinary skill would expect a greater degree of crosslinking for a given hydrogel polymeric material will result in a corresponding decrease in water content, i.e., at equilibrium, the weight percentage of water absorbed by the polymeric network under physiological conditions relative to its total (dry plus water) weight. Hydrogels can be classified as synthetic or natural according to their origin; degradable or stable depending on their stability characteristics, and intelligent or conventional depending on their ability to exhibit significant dimensional changes with variations in pH, temperature, or electric field.

One class of conventional synthetic hydrogels is prepared by free-radical polymerization of vinyl or (meth)acrylate monomers. These chemistries were the basis for the first successful contact lens materials. Several important classes of monomers are recognized by persons of skill with an interest to prepare hydrogel polymeric materials. There are the neutral monomers, for example, but not limited to, methacrylates and acrylates, e.g., 2-hydroxyethyl methacrylate (HEMA), acrylamide/methacrylamides, e.g., dimethyl acrylamide (DMA), glycerol methacrylate (GMA) and cyclic lactams, e.g., N-vinyl-2-pyrrolidone (NVP). Another class of monomers is the ionic or charged (under physiological conditions) monomers, including, but not limited to, methacrylic acid, acrylic acid, methylpropylsulfonic acid and p-styrene sulfonate. Typically, in the making of contact lenses the ionic class of monomer is present at low concentration relative to the neutral class of monomer, but the former can have a dramatic effect on water content of the material. The ionic functionality in a buffered saline environment can significantly increase the water content of a hydrogel. For example, copolymerization of 2% w/w methacrylic acid with HEMA results in a hydrogel possessing a water content of 60% (compared with 38% water content for HEMA alone). As used herein "(meth)" refers to an optional methyl substitution. Thus, a term such as "(meth)acrylate" denotes both methacrylic and acrylic radicals. Hydrogels may also employ the use of zwitterionic monomers. These are extremely hydrophilic monomer possessing both a negative and positive charge within the same molecule and are known for their excellent biocompatibility. Zwitterionic monomers, such as (2-Methacryloyloxyethylphosphorylcholine), are used in the fabrication of biocompatible medical devices that suppress the attraction of protein and bacteria yet provide for a highly wettable and lubricious surface.

Hydrogels were extremely successful as contact lens materials due to their ideal properties such as a low modulus of elasticity, excellent tear strength, good wetting, and lubricity with minimal deposition. The main drawback to these materials was their low permeability to oxygen. The cornea obtains all its oxygen from the atmosphere, so during lens wear several adverse physiological events can occur. The main drawback of conventional hydrogels is that the oxygen permeability is driven by the water content. The higher the water content, the higher the oxygen permeability. The high-water content materials, however, suffer from poor mechanical properties and when worn clinically, result in an adverse clinical outcome referred to as epithelial dehydration. In this event, the hydrogel to maintain its water content removes water from the cornea leading to a clinically unacceptable condition.

As a result of the low oxygen permeability of conventional hydrogels, researchers began to explore the use of polydimethylsiloxane as a contact lens material, primarily due to its extremely high oxygen permeability. This approach, however, was unsuccessful. One of the drawbacks is that polydimethylsiloxane is hydrophobic and requires a plasma surface treatment to render the materials wettable. This was a costly manufacturing step that was generally ineffective. The primary drawback of this approach, however, was silicone-based materials adhered to the cornea during lens wear, because the material had little water (<1.0%) and due to its elastic properties, polydimethylsiloxane materials created a 'suction-cup' effect. This resulted in numerous clinical issues.

Silicone hydrogel is a revolutionary lens material because it incorporates the high Dk levels of silicone with the benefits of conventional hydrogel lens materials. This means that, unlike conventional hydrogels that limit the Dk to the water content, the Dk of silicone hydrogels is controlled by the level of silicone incorporated into the base material. The result is a much higher Dk. A variety of approaches to design silicone hydrogels have been described.

Silicone hydrogels combine the high oxygen permeability of polydimethylsiloxane and the excellent water absorption characteristics of a hydrogel. However, for the application of a contact lens, one well-known issue with preparing silicone hydrogels is that silicone-based monomers and polymers are hydrophobic and insoluble in hydrophilic monomers resulting in incompatible-phase separated materials. Some of first silicone hydrogels were based on simple polydimethyl siloxane or siloxy derivatives containing polymerizable groups (Deichert, et al, U.S. Pat. No. 4,277,595). The copolymerization of this type of (meth)acrylate functionalized silicones with hydrophilic monomers almost always resulted in opaque, phase separated materials due to the incompatibility of silicones with the polar monomers. In this situation, a high level of a non-reactive solubilizing agent was required. This increased the manufacturing cost significantly due to the need for additional extraction methodologies. Also, these materials were inherently non-wetting and lipophilic. Technical approaches to minimize such mix incompatibility included the use hydrophilic groups incorporated within the silicone or siloxy functionality.

Perhaps the earliest patent that describes the development of a silicone hydrogel lens formulation possessing hydrophilic functionality can be found in Tanaka (U.S. Pat. No. 4,139,513). This patent describes the use of a polymerizable siloxy silicone containing a hydroxy functionality (SIGMA). The described silicone hydrogel formulation consisted of SIGMA together with various hydrophilic monomers. This was one of the first approaches described in the patent literature to impart miscibility of silicone with hydrophilic monomers. The approach was limited, however, in that it failed to provide for suitable oxygen permeability due to the low level of silicone within the SIGMA molecule. These materials were never commercialized. Another similar was described by Harvey (U.S. Pat. No. 4,711,943) where an amide functionality was incorporated within a siloxy monomer. This approach, like that of Tanaka, fails to provide the necessary oxygen permeability required for contact lens wear. Also, both the Tanaka and Harvey approaches were reported to result in contact lenses of poor wetting characteristics. Silicone, due to its overall hydrophobic and surfactant characteristics, can easily surface migrate rendering a completely non-wetting surface-despite the hydrogel's ability to uptake water.

Another approach for the design of hydrophilic silicones was described in Keogh (U.S. Pat. Nos. 4,260,725 and 4,259,467). In this effort, a series of methacrylate end-capped polydimethylsiloxanes containing hydrophilic side-chain functionality were disclosed. This was one of the first attempts to design an inherently wettable material possessing a high level of oxygen permeability. However, these materials suffered from extremely poor mechanical properties and were never commercialized.

The first silicone hydrogels were commercially introduced in the mid 1990's and utilized a plasma treatment to render the surface wettable. This technique is extremely costly, yet it resulted in the first successful silicone hydrogel that is still sold today (see Bambury et. al, U.S. Pat. No. 6,166,236). The formulation described within this effort included a vinyl carbamate-based siloxy derivative together with a longer chain divinyl carbonate capped polydimethylsiloxane. The vinyl carbamate functionality provided for increased compatibility with hydrophilic monomers, such as NVP, however, a high level of a non-reactive solubilizing cosolvent was still required to render a transparent material. This dramatically increases the complexity of the overall manufacturing process and increased cost significantly. A similar approach was described by Nicholson (U.S. Pat. No. 5,965,631). In this effort, silicone hydrogels were prepared through the polymerization of methacrylate capped urethane silicone copolymers together with hydrophilic monomers. In the effort, a high level of solubilizing agents was also required. Further, both the Bambury and Nicholson approached suffered from inconsistent wetting and lipid update during lens wear.

The next generation silicone hydrogel material included the addition of a high molecular weight, hydrophilic polymer directly mixed in with the monomer mix formulation. The materials contained as the base polymer, a high molecular polymerizable monofunctional polydimethylsiloxane and SIGMA together with hydrophilic components such as dimethyl acrylamide and a high molecular weight PVP (see, McCabe et al. (U.S. Pat. Nos. 6,822,016 and 7,052,131). This application describes a process of making a polymeric, ophthalmic lens material from a high molecular weight hydrophilic polymer and a polymerizable monofunctional silicone. This was one of the first attempts to incorporate the monofunctional to reduce the overall modulus of the resultant hydrogel. However, a high level of non-reactive diluent was required to overcome the incompatibility of the system.

Still another approach relies upon the use of a dual phase or a dual network polymerization (U.S. Pat. No. 9,039,174). The wetting of the latter hydrogel material is achieved through the selective use of monomers with very different reactivity rates as described above, and is often referred to as dual-phase, dual network, or bi-phase polymerization. It is when two or more free-radical, vinyl monomers with two very different reactivity rates provide for a polymer of essentially two homopolymers. The reactivity of the monomers allows for the fast and complete polymerization of the methacrylate functionality followed by NVP (N-vinyl pyrrolidone). Through careful control of the polymerization rate and degree of crosslinking, high molecular weight poly vinyl pyrrolidone (PVP) chains embedded within a silicone mesh are created. The PVP chains are essentially free to migrate within the silicone matrix and, and in an aqueous environment, are driven to the surface of the lens resulting in good wetting and lubricity. The formulation described within this application contains a high concentration of NVP together with a methacrylamide terminated polydimethylsiloxane and a monofunctional silicone to reduce the overall modulus of the resultant material. The drawback to this approach is that again, a high level of non-reactive diluent is required to render the material transparent.

Despite the successful use of polydimethyl siloxane, there are several known issues that have recently been published. The first issue surrounds the synthesis of polydimethylsiloxane. The synthesis involves the ring opening polymerization of cyclic siloxanes. All polydimethylsiloxanes use cyclic siloxanes in the reaction scheme. Cyclic siloxanes have been recently identified as persistent and toxic bio accumulative substances. Numerous articles on the analysis, bioaccumulation, toxicity, and long-range transport of cyclic siloxanes have been reported. In fact, the EU has requested the European Chemical Agency to consider restrictions of cyclic silicones. Canada may also ban the use of cyclic siloxanes (Chemical and Engineering News). The US Environmental Protection Agency (EPA) granted a decision in 2020 to perform a risk evaluation of cyclic siloxanes under the Toxic Substances Control Act (TSCA). Furthermore, low levels of unreacted cyclic siloxanes persist in all siloxane-based materials and the ability of manufacturers to remove these compounds following manufacturing remains in question. This is particularly true with contact lens materials that are water extracted. As a result, the 'as polymerized' material contains a significant amount of unreacted siloxane cyclics and oligomers that can only be removed via an organic extraction. This extraction utilizes significant amounts or organic solvents that require disposal. For the water extracted only silicone hydrogels the cyclic and siloxanes remain and are free to leach during lens wear. Furthermore, once the final extracted product in autoclaved, degradation of the siloxane background can occur resulting in additional linear and cyclic siloxane extractables.

There remains a need in the art for new monomers that can provide hydrogels which possess desirable properties such as high oxygen permeability, the ability to tailor water content, a low modulus of elasticity, wetting and lubricity and where processing steps can be minimized to reduce manufacturing complexity, the use of organic solvents for extraction, and ultimately improved clinical performance and safety. This invention describes a novel approach for the design of polymerizable hydrophilic siloxy formulations that are free of cyclic and linear siloxanes and can be extracted with water only. Prior to the invention as claimed herein, polymerizable hydrophilic silicones possessing improved compatibility with hydrophilic monomers that provide for inherent wetting characteristics for contact lens application and are free of cyclic and linear siloxanes has not been explored.

SUMMARY OF THE INVENTION

This invention describes a novel approach for the design of high oxygen permeable contact lens silicone hydrogel materials that possess a low modulus elasticity, excellent tear strength and a highly wettable, lubricious surface that does not require the use on a non-reactive solubilizing agent. These silicone hydrogels materials described herein are based on a series of novel polymerizable hydrophilic side-chain siloxy monomers and prepolymers. The siloxy silane hydrogels are free of cyclic siloxanes and higher molecular weight polysiloxanes.

The invention is a composition comprising at least one (meth)acrylic monomer, at least one vinyl containing monomer and at least one polymerizable hydrophilic side-chain siloxy-based methacrylate monomer of Formula I:

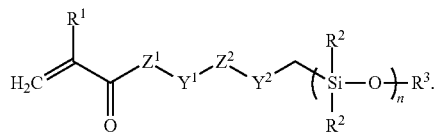

wherein:

$R^1$ is hydrogen or methyl;

$Y_1$ and $Y_2$ are independent of one other and are each a linkage selected from the group consisting of a direct bond, O, $NR^a$, C(O), C(O)$NR^a$, $NR^a$C(O), OC(O)NH, NHC(O)O, $NR^a$C(O)NH, NHC(O)$NR^a$, C(O)O, OC(O), NHC(O)NH$Z_0$—NH—C(O)NH, OC(O)NH$Z_0$—NH—C(O)O, OC(O)NH$Z_0$—NH—C(O)NH, and NHC(O)NH$Z_0$—NH—C(O)O; where $R^a$ is H, $C_1$-$C_4$ alkyl or $C_1$-$C_3$ alkanol, and $Z_0$ is a linear or branched $C_2$-$C_{12}$ alkylene divalent radical, or a $C_5$-$C_7$ cycloaliphatic divalent radical, each of which can optionally include one or more linkages of O, $NR^a$ and C(O); and $Z_1$ and $Z_2$ are independent of one other and are each selected from the group consisting of a direct bond, a $C_1$-$C_{12}$ unsubstituted or substituted, linear or branched alkylene divalent radical, where each alkylene divalent radical can optionally include one or more linkages of O, $NR^a$, and C(O), an unsubstituted phenylene divalent radical, a $C_5$-$C_7$ cycloaliphatic divalent radical, and a $C_7$-$C_{12}$ arylakylene divalent radical, with the proviso that at least two of the groups $Y_1$, $Y_2$, $Z_1$ and $Z_2$ are not a direct bond.

R2 are the same or different and are selected from low alkyl or phenyl groups or alkyl siloxy groups such as: —O—Si(CH$_3$)$_2$—X, where X is selected form lower alkyl, phenyl, or hydrophilic functionalities.

R3 is selected from low alkyl or phenyl groups or alkyl silyl groups such as: —Si(CH$_3$)$_2$—X where X is selected from lower alkyl, phenyl, or hydrophilic functionalities. The repeat unit n can be an integer from 0-3. The hydrophilic functionalities (X) are based primarily on nitrogen containing molecules:

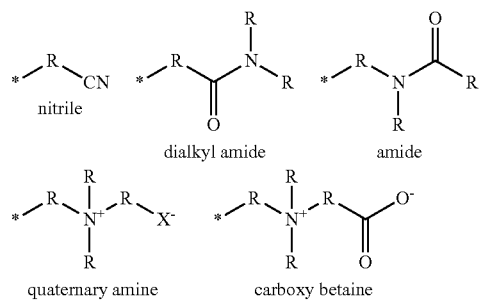

Where R is independent of one other is a linkage selected from the group consisting of a direct bond, O, $NR^a$, C(O), C(O)$NR^a$, $NR^a$C(O), OC(O)NH, NHC(O)O, $NR^a$C(O)NH, NHC(O)$NR^a$, C(O)O, OC(O), NHC(O)NH$Z_0$—NH—C(O)NH, OC(O)NH$Z_0$—NH—C(O)O, OC(O)NH$Z_0$—NH—C(O)NH, and NHC(O)NH$Z_0$—NH—C(O)O; where $R^a$ is H, $C_1$-$C_4$ alkyl or $C_1$-$C_3$ alkanol, and $Z_0$ is a linear or branched $C_2$-$C_{12}$ alkylene divalent radical, or a $C_5$-$C_7$ cycloaliphatic divalent radical, each of which can optionally include one or more linkages of O, $NR^a$ and C(O).

The invention is also directed to a biomedical device, e.g., a contact lens, comprising a siloxy-based hydrogel polymer prepared from the composition comprising the siloxy based monomer of formula I, at least one (meth)acrylic based monomer(s), hydrophilic monomers, a UV, and Visible light blocker agent together with suitable crosslinking agents. The composition is particularly suited for making a daily disposable, high oxygen permeable hydrogel contact lens.

DETAILED DESCRIPTION OF THE INVENTION

This invention describes the design of an inherently wettable contact lens material based on hydrophilic siloxy-based hydrogels possessing low modulus elasticity, excellent tear strength, highly wettable and lubricious surface that can be manufactured at low cost. The inventive formulations contain at least one siloxy-based monomer(meth)acrylate monomer, at least one additional methacrylate monomer, UV, and Visible light blocking agents and one or more crosslinking agents. The final product results in a highly wettable material along with optimal physical properties such modulus of elasticity, oxygen permeability, and a relatively low level of extractables during manufacture—all of which, collectively, must be considered and balanced for a contact lens to be clinically successful.

This invention describes the design of high oxygen permeable contact lens materials based on cyclic and siloxane free high DK siloxy-based hydrogels possessing low modulus elasticity, excellent tear strength, highly wettable and lubricious surface that can be manufactured at low cost. It overcomes the potential toxic and bio accumulative chemistries of cyclic siloxanes and higher molecular weight polydimethylsiloxanes utilized in commercial contact lens formulations. The inventive formulations contain at least one siloxy-based monomer(meth)acrylate monomer, at least one additional methacrylate monomer, UV, and Visible light blocking agents and one or more crosslinking agents. The final product results in a highly wettable material along with optimal physical properties such modulus of elasticity, oxygen permeability, and a relatively low level of extractables during manufacture—all of which, collectively, must be considered and balanced for a contact lens to be clinically successful.

In addition, the siloxy based copolymer formulations described herein provide for a relatively consistent hydrogel polymer framework, which is an important commercial consideration in that the hydrogel material can be reproduced within production specifications for a given polymerization monomer mix. Such consistency is particularly important when it comes to the dimensional stability of the hydrogel matrix over time, e.g., a contact lens should maintain dimensional stability in its packaging for at least three years or more as well as maintain dimensional stability when positioned in the eye.

The composition comprises at least one (meth)acrylic monomer, at least one vinyl containing monomer and at least one polymerizable hydrophilic side-chain siloxy-based methacrylate monomer of Formula I:

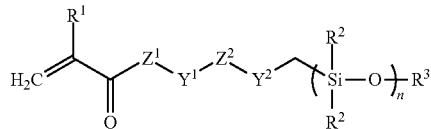

wherein:
$R^1$ is hydrogen or methyl;
$Y_1$ and $Y_2$ are independent of one other and each is a linkage selected from the group consisting of a direct bond, O, $NR^a$, C(O), C(O)$NR^a$, $NR^a$C(O), OC(O)NH, NHC(O)O, $NR^a$C(O)NH, NHC(O)$NR^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where $R^a$ is H, $C_1$-$C_4$ alkyl or $C_1$-$C_3$ alkanol, and $Z_0$ is a linear or branched $C_2$-$C_{12}$ alkylene divalent radical, or a $C_5$-$C_7$ cycloaliphatic divalent radical, each of which can optionally include one or more linkages of O, $NR^a$ and C(O); and
$Z_1$ and $Z_2$ are independent of one other each is selected from the group consisting of a direct bond, a $C_1$-$C_{12}$ unsubstituted or substituted, linear or branched alkylene divalent radical, where each alkylene divalent radical can optionally include one or more linkages of O, $NR^a$, and C(O), an unsubstituted phenylene divalent radical, a $C_5$-$C_7$ cycloaliphatic divalent radical, and a $C_7$-$C_{12}$ arylakylene divalent radical, with the proviso that at least two of the groups $Y_1$, $Y_2$, $Z_1$ and $Z_2$ is not a direct bond.

R2 are the same or different and are selected from low alkyl or phenyl groups or alkyl siloxy groups such as: —O—Si(CH$_3$)$_2$—X, where X is selected form lower alkyl, phenyl, or hydrophilic functionalities. R3 is selected from low alkyl or phenyl groups or alkyl silyl groups such as: —Si(CH$_3$)$_2$—X where X is selected from lower alkyl, phenyl, or hydrophilic functionalities. The repeat unit n can be the same or different and is an integer from 0-3. The hydrophilic functionalities (X) are based primarily on nitrogen containing molecules:

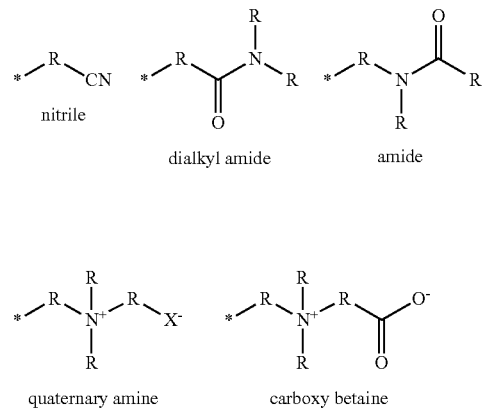

Where R is independent of one other is a linkage selected from the group consisting of a direct bond, O, $NR^a$, C(O), C(O)$NR^a$, $NR^a$C(O), OC(O)NH, NHC(O)O, $NR^a$C(O)NH, NHC(O)$NR^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where $R^a$ is H, $C_1$-$C_4$ alkyl or $C_1$-$C_3$ alkanol, and $Z_0$ is a linear or branched $C_2$-$C_{12}$ alkylene divalent radical, or a $C_5$-$C_7$ cycloaliphatic divalent radical, each of which can optionally include one or more linkages of O, $NR^a$ and C(O).

This invention is directed to hydrophilic side-chain siloxy-based methacrylate monomer of formula II:

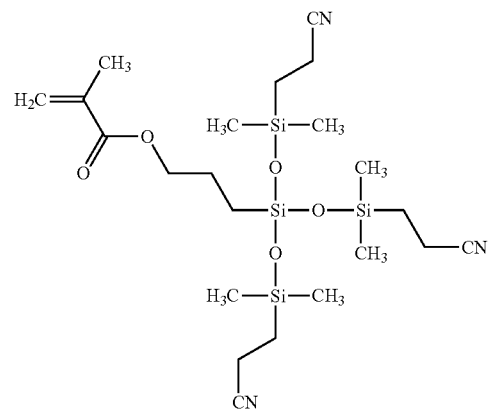 [SMILES: C=C(C)C(=O)OCCC[Si](O[Si](C)(C)CCC#N)(O[Si](C)(C)CCC#N)O[Si](C)(C)CCC#N]

In another embodiment, the hydrophilic side-chain siloxy-based methacrylate monomer is of formula III:

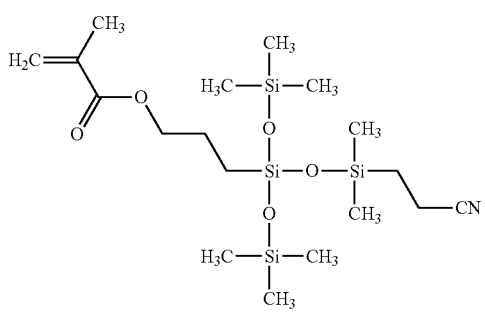 [SMILES: C=C(C)C(=O)OCCC[Si](O[Si](C)(C)C)(O[Si](C)(C)C)O[Si](C)(C)CCC#N]

In one embodiment, the hydrophilic side-chain siloxy-based methacrylate monomer is of formula IV:

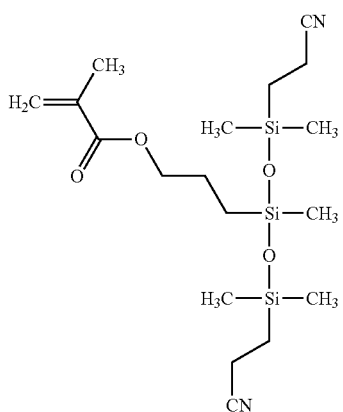 [SMILES: C=C(C)C(=O)OCCC[Si](C)(O[Si](C)(C)CCC#N)O[Si](C)(C)CCC#N]

In another embodiment, the hydrophilic side-chain siloxy-based methacrylate monomer is of formula V:

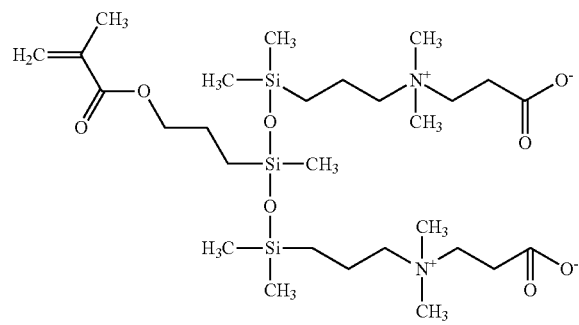 [SMILES: C=C(C)C(=O)OCCC[Si](C)(O[Si](C)(C)CCC[N+](C)(C)CCC(=O)[O-])O[Si](C)(C)CCC[N+](C)(C)CCC(=O)[O-]]

The invention is also directed to a composition comprising at least one siloxy monomer, at least one (meth)acrylic monomer, a UV or Visible light blocking agent and crosslinking agent. The crosslink agent may include at least one free-radical reactive site for vinyl-containing monomer and at least one free-radical reactive site for meth(acrylic)-containing monomer or combinations thereof. Following polymerization by thermal or photochemical initiation the compositions provide a hydrogel material with an inherently wettable surface. Although the above siloxy based monomers can be used with many polymeric systems, of present interest are hydrogel materials. In addition, the polymer compositions provide an opportunity to design a unique morphology where bioinspired monomers are simultaneously incorporated with the polymeric network. These bioinspired hydrogel compositions possess desirable physical characteristics useful for contact lens materials. Such properties include low modulus of elasticity, a high level of oxygen permeability, suitable tear strength, a relatively low level of extractables, a low affinity for bacteria and inherent wettability and lubricity.

The siloxy monomers of formula I are present in the composition from 10 percent by weight to 90 percent by weight, based on the weight of the total composition, excluding the weight of any diluent present in the composition. In fact, all stated percentages by weight of any respective component in the described compositions are based on the total weight of the composition excluding the weight of any diluent present in the composition.

The compositions of interest will also include other hydrophilic monomers that are well known in the contact lens art, and include, but not limited to, 2-hydroxyethyl methacrylate (HEMA), glyceryl monomethacrylate (GM) and 2-acrylamido-2-methyl propane sulfonic acid (AMPS). Examples of other hydrophilic monomers useful for polymerization with the vinyl monomer include, but are not limited to, unsaturated carboxylic acids, e.g., acrylic acids, methacrylic acids and the like; (meth)acrylic substituted alcohols, e.g., 3-hydroxypropyl methacrylate, 3-hydroxypropyl acrylate and the like. Still other hydrophilic monomers include the azetidinium and the oxazolone-based monomers disclosed in U.S. Pat. No. 4,910,277. Specific bioinspired monomers include, but are not limited to, carboxybetaines, sulfobetains and phosphobetaines, such as methacryloxy phosphatidyl choline (MPC), N-vinylcarboxy ethyl phosphatidyl choline, O-vinyl ethyl phosphatidyl choline carbonate, 1-(3-sulfopropyl)-2-vinylpyridinium betaine, 3-dimethyl(acryloyloxyethyl) ammonium propyl sulfonate, functional sugars, and proteins, or any one mixture of bioinspired monomer. Other suitable bioinspired hydrophilic monomers will be apparent to one skilled in the art. The bioinspired monomer is present from 5.0 to 70 percent by weight.

As stated, preferred compositions will include a (meth)acrylate crosslinking agent to provide the necessary structural stability to the hydrogel polymer framework. Many of these (meth)acrylate crosslinking agents are known in the art of hydrogel materials. The (meth)acrylate crosslink agents include, but are not limited to, any one difunctional or multifunctional crosslink agent, and any one mixture thereof. Representative examples of such crosslinkers include, but are not limited to, tripropylene glycerol diacrylate, ethylene glycol dimethacrylate, tetraethylene glycol dimethacrylate, poly (ethylene glycol diacrylate) (PEG400 or PEG600), allyl methacrylate and the like. In addition, diacrylates and dimethacrylates of triethylene glycol, butylene glycol, neopentyl glycol, ethylene glycol, hexane-1,6-diol, and thio-diethylene glycol; trimethylolpropane triacrylate, N,N'-dihydroxyethylene bisacrylamide, diallyl phthalate, triallyl cyanurate, divinylbenzene, ethylene glycol divinyl ether, or N,N'-methylene-bis-(meth)acrylamide, sulfonated divinylbenzene, divinylsulfone. The crosslinking agent is present in the composition from 0.1% to 3% by weight, from about 0.2% to about 1% by weight, or from 0.2% to 0.6% by weight.

The chemistry of hydrogels is well known and there exists a variety of monomers that can be used to make the hydrogel materials. Monomers of interest to the contact lens art include acrylate, acrylamide, methacrylate, methacrylamide, styrene-containing monomers, dimethacrylate and dimethacrylamide monomers, vinyl amide-containing monomers, vinyl carbonate/carbamate/urea monomers, and (meth)acrylate/(meth) acrylamide-capped prepolymers. Suitable monomers may be represented by the general formulae:

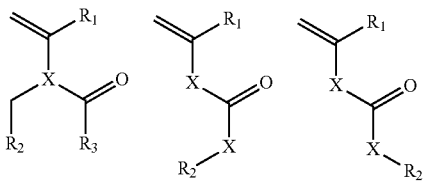

wherein X is O or $NR^a$, where $R^a$ is hydrogen, $C_1$-$C_4$ alkyl or $C_1$-$C_3$ alkanol; $R^1$ is H or $CH_3$; and $R^2$ and $R^3$ are independently hydrogen, a $C_1$-$C_{18}$ alkyl, $C_3$-$C_{18}$ cycloalkyl, $C_3$-$C_{18}$ cycloalkylalkyl, $C_3$-$C_{18}$ cycloalkenyl, $C_5$-$C_{30}$ aryl, $C_5$-$C_{30}$ arylalkyl, each of which can be optionally substituted, linear or branched, or $R^2$ and $R^3$ together with the nitrogen atom to which they are bonded are joined together to form a heterocyclic group.

The vinyl monomers of interest in hydrogel systems are vinyl hydrophilic monomers, and a class of N-vinyl hydrophilic monomer. For example, the vinyl hydrophilic monomer is selected from an N-vinylamide monomer of formula A, a vinyl pyrrolidone of formula B, C or D, or an n-vinyl piperidone of formula E:

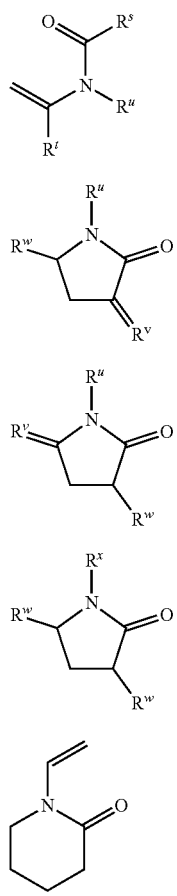

wherein
$R^t$ is H or $CH_3$, and in one embodiment $R^t$ is H;
$R^s$ and $R^w$ are independently selected from H, $CH_3$, $CH_2CH_3$, $CH_2CH_2CH_3$, $C(CH_3)_3$;
$R^u$ is selected from H, $CH_3$, $CH_2CH_3$; and
$R^v$ is selected from $CH_2$, $CHCH_3$ and $C(CH_3)_2$;
$R^x$ is selected from $CH=CH_2$, $CCH_3=CH_2$, and $CH=CHCH_3$.

Any one of the above N-vinyl lactams can be used alone or in admixture with other lactam monomers to provide hydrogel materials with the properties of interest. Illustrative of the other lactam monomers are, for example, N-vinyl imidazole, N-vinyl succinimide, N-vinyl diglycolylimide, N-vinyl glutarimide, N-vinyl-3-morpholinone and N-vinyl-5-methyl-3-morpholinone. The use of a dual-reactive cross-linking agents is also of particularly interest when using N-vinyl lactams. This is especially useful when using a slow reacting monomer, such as an N-vinyl pyrrolidinone (NVP).

Useful hydrophobic monomers for use herein include, but are not limited to, alkyl acrylates and methacrylates, 4-t-butyl-2-hydroxy cyclohexyl methacrylate (TBE), tert-butyl cyclohexyl methacrylate, isopropylcyclopentyl acrylate, tert-butylcyclohexyl acrylate, isobornyl methacrylate and the like; 2-ethylhexyl methacrylate, 2-phenyloxyethyl methacrylate, partially fluorinated acrylates, partially fluorinated methacrylates and the like and mixtures thereof.

Accordingly, it can be of interest to include one or more commercially available siloxy-based monomers in a composition of interest. Some well-known siloxy monomers include the TRIS-like and Trisiloxane (siloxy silane) monomers represented by the following structures.

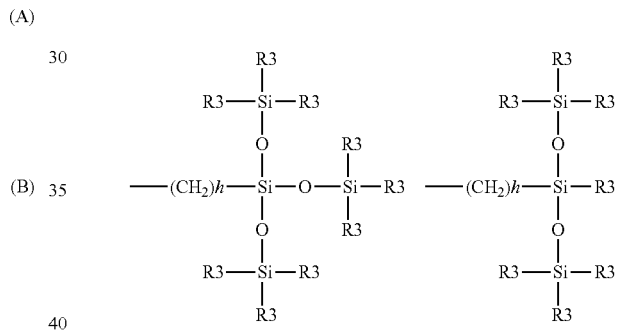

wherein h is 1 to 18 and each $R^3$ independently denotes a lower alkyl radical, or phenyl radical. Representative examples of such acrylate ester and/or methacrylate ester-containing monomers include 3-methacryloyloxypropyltris (trimethylsiloxy)silane or (3-methacryloxy-2-hydroxypropyloxy) propylbis(trimethylsiloxy) methylsilane), sometimes referred to as TRIS and SIGMA, respectively, and are commercially available from such sources as Gelest, Inc. (Morrisville, Pa.). Other examples of siloxy silanes include, pentamethyldisiloxanyl methylmethacrylate, phenyltetramethyl-disiloxanylethyl acrylate, methyldi(trimethylsiloxy) methacryloxymethyl silane, 3-[tris(trimethylsiloxy)silyl] propyl vinyl carbamate, 3[tris(trimethylsiloxy) silyl]propyol allyl carbamate, and 3-tris(trimethylsiloxy) silyl] propyl vinyl carbonate.

This invention describes siloxy based hydrogels that are free of classical silicone monomers referred in the art as silicone monofunctional and dimethacrylate or multimethacrylate siloxane prepolymers (see, U.S. Pat. No. 8,937,110 to Vanderlaan and U.S. Pat. No. 5,321,108 to Kunzler). For example, silicone monofunctional monomers include monomethacryloxyalkyl-polydimethylsiloxane and dimethacrylate functionalized polydimethyl siloxanes.

The siloxy-containing monomer(s) is present in the described compositions in an amount enough to provide the desired oxygen permeability. It is a benefit of the present invention that oxygen permeabilities greater than about 60 barriers, greater than about 80 barrier, and in some embodiments greater than about 90 barrier can be achieved. Suitable amounts will include from 20% to 60% by weight, and in some embodiments from about 30% to 80% by weight.

In general, the copolymerization reaction is ideally performed neat or with a suitable cosolvent to control lens expansion. The monomeric mixture and optional crosslinking agent(s) are combined in the desired ratio, and then exposed to, for example, ultraviolet (UV) light or electron beams in the presence of one or more photoinitiator(s) or at a suitable temperature, for a time sufficient to form the copolymer. Heat may also be employed to initiate the polymerization in which case a series of Vazo, peroxide or peroxy initiators, well-known in the art, may be used. Suitable reaction times will ordinarily range from about 1 minute to about 24 hours and preferably from about 1 hour to about 10 hours.

The use of UV or visible light in combination with photoinitiators is well known in the art and is particularly suitable for formation of the copolymer. Numerous photoinitiators of the type in question here are commercial products. Photo initiators enhance the rapidity of the curing process when the photo curable compositions are exposed to, for example, ultraviolet radiation. Suitable photo initiators which are useful for polymerizing the polymerizable mixture of monomers can be commercially available photo initiators. They are generally compounds which can initiate the radical reaction of olefinically unsaturated double bonds on exposure to light with a wavelength of, for example, about 260 to about 480 nm.

Examples of suitable photo initiators for use herein include, but are not limited to, one or more photo initiators commercially available under the "IRGACURE®", "DAROCUR®" and "SPEEDCURE" trade names (manufactures by Ciba Specialty Chemicals, also obtainable under a different name from BASF, Fratelli Lamberti and Kawaguchi), e.g., "IRGACURE®" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl)phosphine oxide and 2-hydroxy-2-methyl-1-phenyl-propan-1-one), and 819 [bis(2,4,6-trimethyl benzoyl)phenyl phosphine oxide] and "DAROCUR®" 1173 (2-hydroxy-2-methyl-1-phenyl-1-propan-1-one) and 4265 (the combination of 2,4,6-trimethylbenzoyldiphenyl-phosphine oxide and 2-hydroxy-2-methyl-1-phenyl-propan-1-one); and the like and mixtures thereof. Other suitable photo initiators for use herein include, but are not limited to, alkyl pyruvates such as methyl, ethyl, propyl, and butyl pyruvates, and aryl pyruvates such as phenyl, benzyl, and appropriately substituted derivatives thereof. Generally, the amount of photo initiator can range from about 0.05% w/w to about 5% w/w and preferably from about 0.1% w/w to about 1% w/w.

Examples of suitable thermal initiators for use herein include, but are not limited to, include the azo and peroxy type compounds, such as 2,2-azobisisobutyronitrile (VAZO 64), 4,4-azobis(4-cyanovaleric acid), 1,1-azobis(cyclohexanecarbonitrile), benzoyl peroxide, 1,1-bis(tert-butylperoxy)cyclohexane, tert-butyl hydroperoxide, tert-butyl peroxybenzoate and dicumyl peroxide. Generally, the amount of thermal initiator can range from about 0.05% w/w to about 5% w/w and preferably from about 0.1% w/w to about 1% w/w.

An organic diluent (non-reactive solvent) can be included in any one composition of interest to control the lens expansion characteristics only. As used herein, the term "organic diluent" encompasses organic compounds which minimize incompatibility of the components in the initial monomeric mixture and are substantially nonreactive with the components in the initial mixture. Contemplated organic diluents include alcohols such as tert-butanol (TBA), tert-amyl alcohol, diols, such as ethylene glycol; and polyols, such as glycerol. Preferably, the organic diluent is water soluble and can be removed easily through a water extraction process. Other suitable organic diluents would be apparent to a person of ordinary skill in the art. Generally, the diluent is included at 0 to 60% by weight of the monomeric mixture, with 1 to 40% by weight being more preferred, 2 to 30% by weight being even more preferred and 3 to 25% by weight being especially preferred.

Suitable UV absorbers may be derived from 2-(2'-hydroxyphenyl) benzotriazoles, 2-hydroxybenzophenones, 2-hydroxyphenyltriazines, oxanilides, cyanoacrylates, salicylates and 4-hydroxybenzoates; which may be further reacted to incorporate reactive polymerizable groups, such as (meth)acrylates. Specific examples of UV absorbers which include polymerizable groups include 2-(2'-hydroxy-5-methacrylyloxyethylphenyl)-2H-benzotriazole (Norbloc), 5-vinyl and 5-isopropenyl derivatives of 2-(2,4-dihydroxyphenyl)-2H-benzotriazole and 4-acrylates or 4-methacrylates of 2-(2,4-dihydroxyphenyl)-2H-benzotriazole or 2-(2,4-dihydroxyphenyl)-1,3-2H-dibenzotriazole, mixtures thereof and the like. When a UV absorber is included, it may be included in amounts between 0.5% and 4% by weight, and suitably between 1% and 2% by weight.

The present invention relates to monomeric formulations useful in the manufacture of biocompatible medical devices. More particularly, the present invention relates to hydrogel formulations capable of polymerization to form polymeric compositions having desirable physical characteristics useful in the manufacture of contact lenses. Such properties include low modulus of elasticity, a high level of oxygen permeability, wettability, lubricity, and a low level of extractables.

According to the present process, the siloxy-based monomers, comprising at least one hydrophilic siloxy monomer(s) is shaped and cured by conventional methods such as static casting or spincasting. The invention is applicable to a wide variety of polymeric materials, either rigid or soft. Especially preferred polymeric materials are lenses including contact lenses, phakic and aphakic intraocular lenses and corneal implants although all polymeric materials including biomaterials are contemplated as being within the scope of this invention. Preferred articles are optically clear and useful as a contact lens.

The compositions described herein can be used to make hydrogel materials for a biomedical device such as artificial heart valves, films, surgical devices, vessel substitutes, intra-uterine devices, membranes, diaphragms, surgical implants, artificial blood vessels, artificial ureters, artificial breast tissue and membranes intended to come into contact with body fluid outside of the body, e.g., membranes for kidney dialysis and heart/lung machines and the like, catheters, mouth guards, denture liners, ophthalmic devices, and especially hydrogel contact lenses.

As used herein, a "biomedical device" is any article that is designed to be used while either in or on mammalian tissues or fluid, and in one embodiment in or on human tissue or fluids. Examples of these devices include but are not limited to catheters, implants, stents, and ophthalmic devices such as intraocular lenses, punctal plugs and contact lenses.

As described earlier, lens formation can be by free radical polymerization such as azobisisobutyronitrile (AIBN) and peroxide catalysts using initiators and under conditions such as those set forth in U.S. Pat. No. 3,808,179, incorporated herein by reference. Photoinitiation of polymerization of the monomer mixture as is well known in the art may also be used in the process of forming an article as disclosed herein. The manufacture of contact lenses is performed via cast molding, spin casting, or rod-lathing techniques-all well-known in the industry.

The examples should not be read as limiting the scope of the invention as defined in the claims. Unless clearly stated otherwise all numerical percentages, e.g., percentage amounts of monomer in a polymerization mixture, are listed as weight percent.

Definitions

TRIS: 3-methacryloxy propyl tris (trimethyl siloxy) silane
Sigma: 3-(3-methacryloxy-2-hydroxypropoxybis (trimethylsiloxy) methyl silane
HEMA: 2-hydroxyethyl methacrylate
NVP: N-vinyl pyrrolidinone
MPC: 2-methacryloyloxy ethyl phosphoryl choline
XL TEGDMA: cross-linker tetra ethylene glycol dimethacrylate
XL Allyl methacrylate: dual phase cross-linker methacrylic acid allyl ester
Vazo 64: 2,2'-azobis (2-methyl propionitrile)

EXAMPLES

All monomer components (both silicone and hydrophilic monomers) were purified before use. Mechanical properties were determined on samples stored in borate buffered saline using ASTM Instron methods. Oxygen permeability values were measured using the polarographic probe method. Films or lenses were prepared via polymerization between treated glass plates having a suitable inert spacer or polypropylene contact lens molds. The films or lenses are extracted in distilled water and/or in 2-propanol, hydrated in borate-buffered saline (pH 7.3) and autoclaved for 30 minutes. Wetting angle is performed via the captive bubble techniques. All the above methods and analytical techniques are well known to a person of ordinary skill in the art.

Example 1. Synthesis of Cyano Functional Disiloxy Methacrylate (Scheme1)

Scheme 1

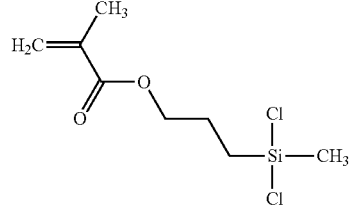

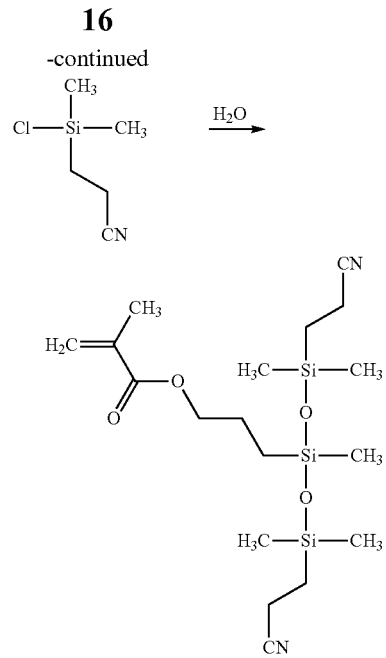

To a flame-dried, round bottom flask is added methacyloyloxy propyl methyl dichloro silane (1 equivalent) 50 ml of diethyl ether under a $N_2$ atmosphere. The flask is cooled to 0° C. under ice-water bath, and cyanoethyl chloro methyl silane (2.1 equivalents) is slowly added dropwise followed by the slow addition of water. The solution is stirred at 0° C. for one hour at which time the solution is brought to room temperature and stirred overnight. The following day, the solution is washed with a saturated brine solution. The organic layer is collected, and solvent evaporated to give the crude product, which was purified by thin film evaporation to remove the disiloxane by-product to give the high purity product.

Example 2. Synthesis of Nitrile Tri Siloxy Silane (Scheme 2)

Scheme 2

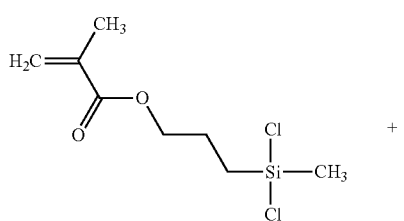

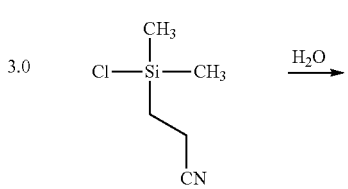

-continued

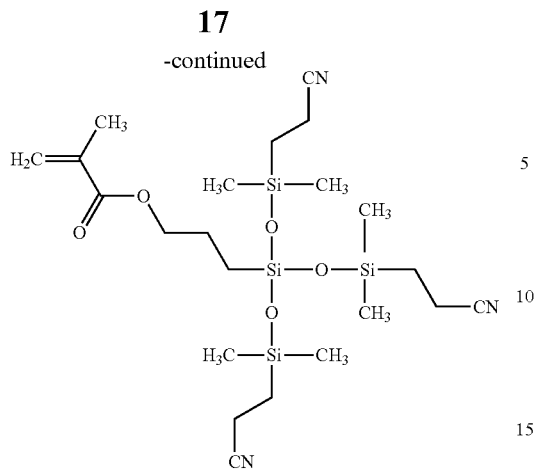

To a flame-dried, round bottom flask is added methacryloyloxy propyl trichloro silane (1.0 equivalent) 50 ml of diethyl ether under a $N_2$ atmosphere. The flask is cooled to 0° C. under ice-water bath, and cyanoethyl chloro dimethyl silane (3.1 equivalent) is slowly added dropwise followed by the slow addition of water. The solution is stirred at 0° C. for one water at which time the solution is brought to room temperature and stirred overnight. The following day, the solution is washed with a saturated brine solution. The organic layer is collected, and solvent evaporated to give the crude product, which was purified by thin film evaporation to remove the disiloxane by-product to give the high purity product.

Example 3. Synthesis of Methyl Nitrile Tri Siloxy Methacrylate (Scheme 3)

Scheme 3

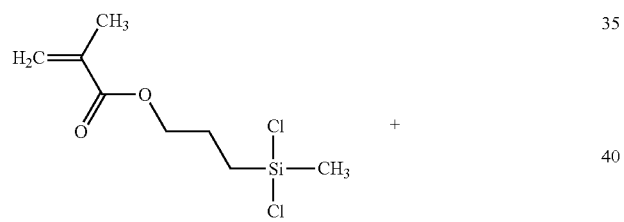

-continued

To a flame-dried, round bottom flask is added methacryloyloxy propyl methyl trichloro silane (1.0 equivalent) 50 ml of diethyl ether under a $N_2$ atmosphere. The flask is cooled to 0° C. under ice-water bath, and cyanoethyl chloro dimethyl silane (1.0 equivalent) and trimethyl chloro silane (2.1 equivalent) is slowly added dropwise followed by the slow addition of water. The solution is stirred at 0° C. for one water at which time the solution is brought to room temperature and stirred overnight. The following day, the solution is washed with a saturated brine solution. The organic layer is collected, and solvent evaporated to give the crude product, which was purified by thin film evaporation to remove the disiloxane by-product to give the desired high purity product.

Example 4. Synthesis of a Methacrylate Monofunctional Carboxy Betaine Siloxy (Scheme 4)

Scheme 4

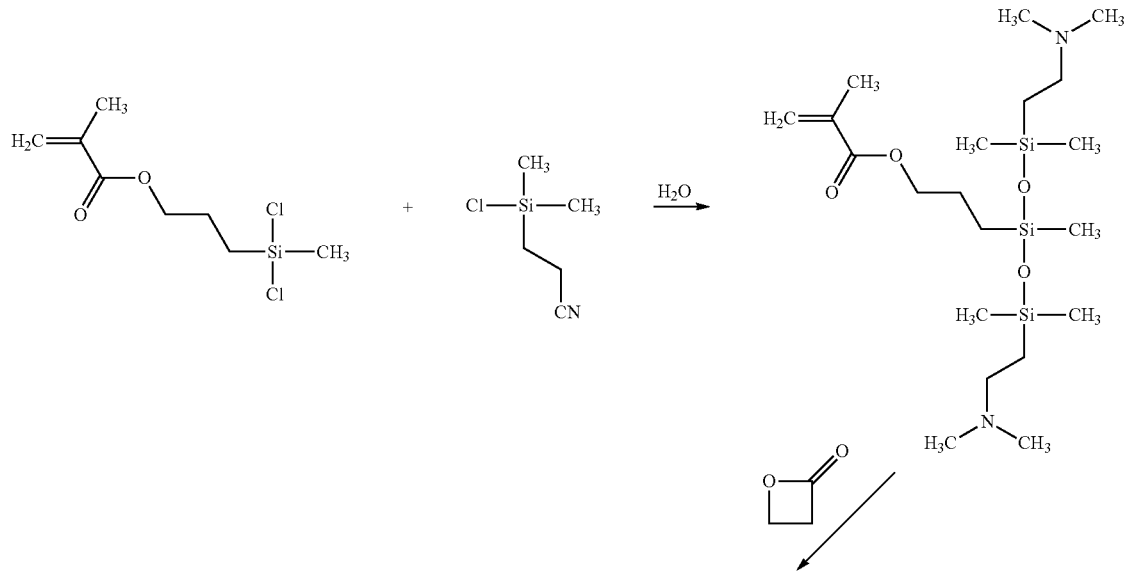

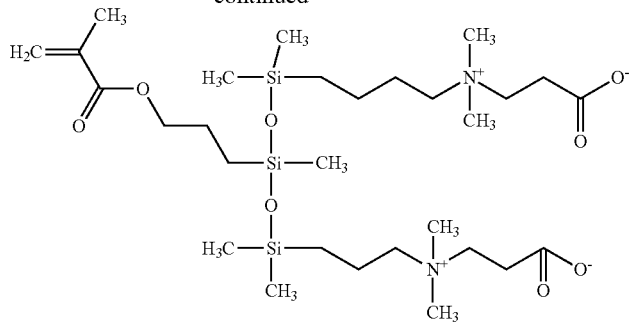

To a flame-dried, round bottom flask is added methacryloyloxy propyl methyl diichloro silane (1.0 equivalent) 50 ml of diethyl ether under a N$_2$ atmosphere. The flask is cooled to 0° C. under ice-water bath, and dimethyl amino propyl chloro methyl silane (2.1 equivalent) is slowly added dropwise followed by the slow addition of water. The solution is stirred at 0° C. for one water at which time the solution is brought to room temperature and stirred overnight. The following day, the solution is washed with a saturated brine solution. The organic layer is collected, and solvent evaporated to give the crude product, which was purified by thin film evaporation to remove the disiloxane by-product to give the high purity product. This was then dissolved in acetone under nitrogen and β-propiolactone (2.1 equivalents) was added at 15° C. to afford the zwitterionic carboxy betaine.

Example 5 Hydrogel Contact Lenses

Hydrogel contact lenses are prepared with the inventive chemistry. The monomer formulation mixture is prepared in a dry box (rel. hum. of approx. 10%). The mixed formulation is added to polypropylene lens molds in the dry box, and the filled molds are placed in an oven at room temperature and purged with nitrogen for 30 minutes. The nitrogen atmosphere is maintained for the entire cure protocol at a level of 100 ppm. The oven temperature is raised to 60° C. (10° C./min ramp rate) and the temperature maintained at 60° C. for 2 hrs. The oven temperature is raised to 80° C. (10° C./min ramp rate) and the temperature maintained at 80° C. for 2 hrs. The oven temperature is raised to 100° C. (10° C./min ramp rate) and the temperature maintained at 100° C. for 2 hrs. The oven temperature is then lowered to 55° C. over the next hour. The lenses are removed from the oven and allowed to cool to room temperature in the dry box. The lenses are dry released from the molds. Alternatively, the lenses can be wet released from the mold. Dry release or wet release methods are well known to those of ordinary skill in the contact lens art.

Once released from the molds, the lenses are extracted with distilled water (3×/10 min) with exchange of fresh water per cycle. The lenses are extracted with borate-buffered saline (BBS, pH 6.8-7.2, osmolality 270-320), 3×/10 min with exchange of fresh BBS per cycle and packaged.

Example 6 Hydrogel Contact Lenses

Monomer mixtures, 6A through 6E, as shown in Table 1 are prepared by mixing the following components: Nitrile Tri Siloxy Methacrylate, Tris Methacrylate, Sigma, Hema and NVP together with the crosslinkers TEGDMA and Allyl Methacrylate and a Vazo 64 initiator. The resultant monomeric mixture is cast in a polypropylene contact lens mold and thermally cured in accordance with the procedure as described in Example 6. The resultant contact lens materials are transparent and highly wettable.

TABLE 1

Siloxy Silane Hydrogel Formulations

| Example | 6A | 6B | 6C | 6D | 6E |
|---|---|---|---|---|---|
| Nitrile Tri Siloxy Silane (Scheme 2) | 65.0 | 50.0 | 40.0 | 40.0 | 25.0 |
| TRIS | 0 | 0 | 0 | 10.0 | 25.0 |
| Sigma | 0 | 15 | 10 | 0 | 0 |
| HEMA | 5.0 | 5.0 | 5.0 | 5.0 | 5.0 |
| NVP | 29 | 29 | 43.9 | 43.9 | 43.9 |
| XL TEGDMA | 0.5 | 0.5 | 0.5 | 0.5 | 0.5 |
| XL Allyl methacrylate | 0 | 0 | 0.1 | 0.1 | 0.1 |
| Vazo 64 | 0.5 | 0.5 | 0.5 | 0.5 | 0.5 |

Example 7 Hydrogel Contact Lenses

Monomer mixtures, 7A through 7E, as shown in Table 2 are prepared by mixing the following components: Methyl Nitrile Tri Siloxy Methacrylate, Tris Methacrylate, Sigma, and MPC together with the crosslinkers TEGDMA and allyl methacrylate and a Vazo 64 initiator. The resultant monomeric mixture is cast in a polypropylene contact lens mold and thermally cured in accordance with the procedure as described in Example 6. The resultant contact lens materials are transparent and highly wettable.

TABLE 2

Siloxy Silane Hydrogel Formulations

| Example | 7A | 7B | 7C | 7D | 7E |
|---|---|---|---|---|---|
| Methyl Nitrile Tri Siloxy (Scheme 3) | 60 | 60 | 50 | 50 | 25 |
| Tris | 19 | 9 | 9 | 19 | 44 |
| Sigma | 0 | 10 | 10 | 0 | 0 |
| MPC | 20 | 20 | 30 | 30 | 30 |
| XL TEGDMA | 0.5 | 0.5 | 0.5 | 0.5 | 0.5 |
| Vazo 64 | 0.5 | 0.5 | 0.5 | 0.5 | 0.5 |

The invention claimed is:
1. A composition comprising at least one (meth)acrylic monomer, at least one vinyl containing monomer and at least one polymerizable hydrophilic side-chain siloxy-based methacrylate monomer of having the formula:

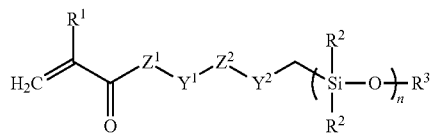

wherein:

$R^1$ is hydrogen or methyl;

$Y_1$ and $Y_2$ are independent of one other and each comprise a linkage selected from the group consisting of a direct bond, O, NR$^a$, C(O), C(O)NR$^a$, NR$^a$C(O), OC(O)NH, NHC(O)O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R$^a$ is H, $C_1$-$C_4$ alkyl or $C_1$-$C_3$ alkanol, and $Z_0$ is a linear or branched $C_2$-$C_{12}$ alkylene divalent radical, or a $C_5$-$C_7$ cycloaliphatic divalent radical, each of which include one or more linkages of O, NR$^a$ and C(O);

$Z_1$ and $Z_2$ are independent of one other and each are selected from the group consisting of a direct bond, a $C_1$-$C_{12}$ unsubstituted or substituted, and a linear or branched alkylene divalent radical, where each alkylene divalent radical includes one or more linkages of O, NR$^a$, and C(O), an unsubstituted phenylene divalent radical, a $C_5$-$C_7$ cycloaliphatic divalent radical, and a $C_7$-$C_{12}$ arylalkyne divalent radical, wherein at least two of the groups $Y_1$, $Y_2$, $Z_1$ and $Z_2$ is not a direct bond, $R^2$ are the same or different and are selected from low alkyl or phenyl groups and alkyl siloxy groups including: —O—Si (CH$_3$)$_2$—X where X is selected from lower alkyl, phenyl, or hydrophilic functionalities, $R^3$ is selected from low alkyl, phenyl groups and alkyl silyl groups including: —Si(CH$_3$)$_2$—X where X is selected from lower alkyl, phenyl, and hydrophilic functionalities, wherein in at least one of $R^2$ or $R^3$, X is selected from the group consisting of

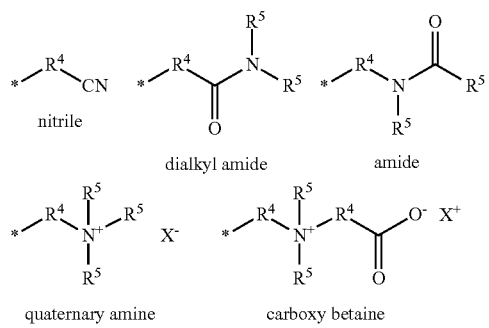

Where R$^4$ is independent of one other and is a linkage selected from the group consisting of a direct bond, O, NR$^a$, C(O), C(O)NR$^a$, NR$^a$C(O), OC(O)NH, NHC(O)O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R$^a$ is H, $C_1$-$C_4$ alkyl or $C_1$-$C_3$ alkanol, and $Z_0$ is a linear or branched $C_2$-$C_{12}$ alkylene divalent radical, R$^5$ is CH$_3$, and n is an integer from 1-3.

2. The composition of claim 1, wherein the at least one vinyl monomer is selected from the group consisting of N-vinyl-2-pyrrolidone, N-vinyl piperidone, N-vinyl-caprolactam, N-vinylimidazolidone, N-vinylsuccinimide, N-vinylformamide, N-vinyl urea, N-vinylcarbamate, O-vinyl carbonate and any one mixture thereof.

3. The composition of claim 2, wherein the at least one (meth)acrylic monomer includes 4-t-butyl-2-hydroxycyclohexylmethacrylate, and the at least one vinyl monomer includes N-vinyl-2-pyrrolidone.

4. The composition of claim 1, wherein the at least one (meth)acrylic monomer includes a functional monomer selected from the group consisting of carboxybetaines, sulfobetains and phosphobetaines.

5. The composition of claim 1, further comprising a silicone monomer selected from the group consisting of Tris-(trimethylsiloxy)-3-methacryloxypropyl methacrylate (Tris), 3-methacryloxy-2-hydroxypropyloxy) propylbis (trimethylsiloxy)-methylsilane (Sigma), and a mixture thereof.

6. A hydrogel polymer prepared from a composition of claim 1.

7. A contact lens formed from a hydrogel polymer as claimed in claim 6.

8. The composition of claim 1, wherein X in both of $R^2$ and $R^3$ is selected from the group consisting of

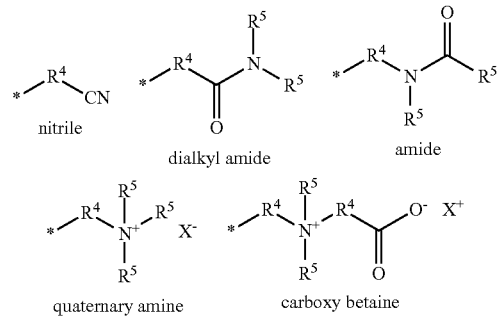

Where R$^4$ is independent of one other and is a linkage selected from the group consisting of a direct bond, O, NR$^a$, C(O), C(O)NR$^a$, NR$^a$C(O), OC(O)NH, NHC(O)O, NR$^a$C(O)NH, NHC(O)NR$^a$, C(O)O, OC(O), NHC(O)NHZ$_0$—NH—C(O)NH, OC(O)NHZ$_0$—NH—C(O)O, OC(O)NHZ$_0$—NH—C(O)NH, and NHC(O)NHZ$_0$—NH—C(O)O; where R$^a$ is H, $C_1$-$C_4$ alkyl or $C_1$-$C_3$ alkanol, and $Z_0$ is a linear or branched $C_2$-$C_{12}$ alkylene divalent radical, R$^5$ is CH$_3$.

9. The composition of claim 1, wherein X in R$^2$ is selected from the group consisting of

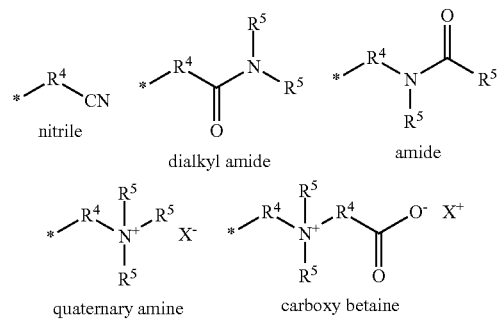

Where $R^4$ is independent of one other and is a linkage selected from the group consisting of a direct bond, O, $NR^a$, C(O), $C(O)NR^a$, $NR^aC(O)$, OC(O)NH, NHC(O)O, $NR^aC(O)NH$, $NHC(O)NR^a$, C(O)O, OC(O), $NHC(O)NHZ_0$—NH—C(O)NH, $OC(O)NHZ_0$—NH—C(O)O, $OC(O)NHZ_0$—NH—C(O)NH, and $NHC(O)NHZ_0$—NH—C(O)O; where $R^a$ is H, $C_1$-$C_4$ alkyl or $C_1$-$C_3$ alkanol, and $Z_0$ is a linear or branched $C_2$-$C_{12}$ alkylene divalent radical, $R^5$ is $CH_3$, and and X in $R^3$ is a methyl group.

10. The composition of claim 1, wherein the at least one polymerizabie hydrophilic side-chain siloxy-based rnethacrylate monomer has the following formula:

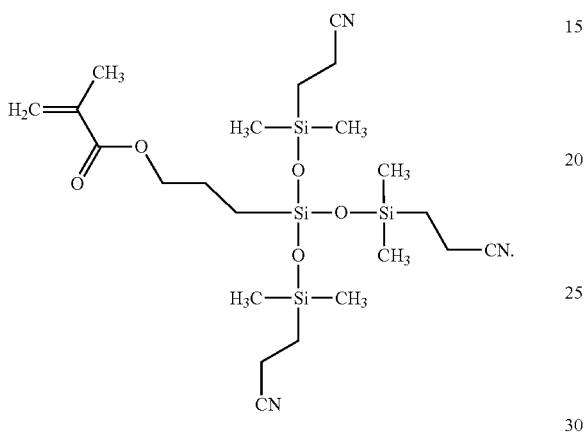

11. The composition of claim 1, wherein the at least one polymerizable hydrophilic side-chain siloxy-based methacrylate monomer has the following formula:

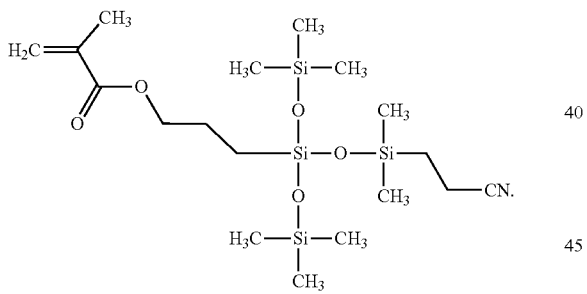

12. The composition of claim 1, wherein the at least one polymerizable hydrophilic side-chain siloxy-based methacrylate monomer has the following formula:

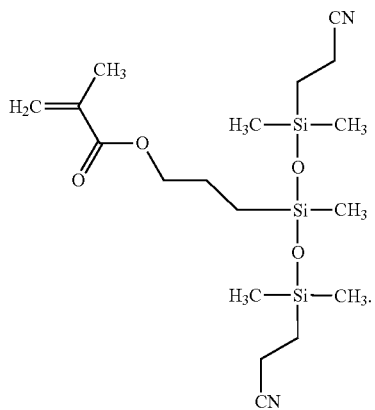 [SMILES: C=C(C)C(=O)OCCC[Si](C)(O[Si](C)(C)CCC#N)O[Si](C)(C)CCC#N]

13. The composition of claim 1, wherein the at least one polymerizable hydrophilic side-chain siloxy-based methacrylate monomer has the following formula:

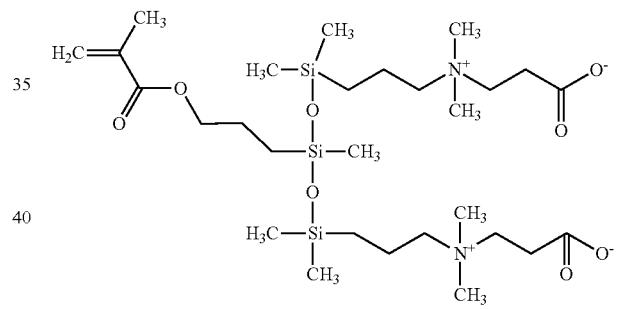

* * * * *